United States Patent
O'Farrell

(10) Patent No.: US 11,403,394 B2
(45) Date of Patent: Aug. 2, 2022

(54) PREVENTING SELECTIVE EVENTS OF A COMPUTING ENVIRONMENT

(71) Applicant: INTERNATIONAL BUSINESS MACHINES CORPORATION, Armonk, NY (US)

(72) Inventor: William O'Farrell, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 16/572,675

(22) Filed: Sep. 17, 2019

(65) Prior Publication Data

US 2021/0081530 A1   Mar. 18, 2021

(51) Int. Cl.
*H04L 29/06* (2006.01)
*G06F 21/55* (2013.01)

(52) U.S. Cl.
CPC ...... *G06F 21/554* (2013.01); *G06F 2221/033* (2013.01)

(58) Field of Classification Search
CPC ............. G06F 21/554; G06F 2221/033; G06F 9/30043; G06F 9/3836; G06F 12/0842; G06F 12/0857; G06F 12/1441; G06F 2212/507; G06F 21/52; G06F 2212/1052; G06F 9/3842; G06F 21/75
See application file for complete search history.

(56) References Cited

U.S. PATENT DOCUMENTS 7,406,581 B2   7/2008  Southwell
9,239,735 B2   1/2016  Anderson et al.
9,852,084 B1*  12/2017 Soderquist .......... G06F 12/1009
2004/0123081 A1*  6/2004  Knies .................... G06F 9/3842
                                                             712/225
2005/0013183 A1*  1/2005  Southwell ............. G06F 9/3861
                                                             712/E9.05

(Continued)

FOREIGN PATENT DOCUMENTS

GB        2570110 A       7/2019

OTHER PUBLICATIONS

Li et al. Conditional Speculation: An Effective Approach to Safeguard Out-of-Order Execution Against Spectre Attacks, 2019 IEEE International Symposium on High Performance Computer Architecture (HPCA), Feb. 2019 (Year: 2019).*

(Continued)

*Primary Examiner* — Taghi T Arani
*Assistant Examiner* — Lin Chang
(74) *Attorney, Agent, or Firm* — Peter Wang, Esq.; Kevin P. Radigan, Esq.; Heslin Rothenberg Farley & Mesiti P.C.

(57) ABSTRACT

Detecting and preventing selected events within a computing environment. A determination is made as to whether a selected event of the computing environment is consistent with a historical pattern of selected events of the computing environment. Based on determining the selected event is inconsistent with the historical pattern of selected events, processing associated with the selected event is delayed. Based on delaying processing associated with the selected event, a determination is made as to whether the selected event is valid. Based on determining that the selected event is valid, processing associated with the selected event is resumed.

19 Claims, 14 Drawing Sheets

(56) References Cited

U.S. PATENT DOCUMENTS

| | | | |
|---|---|---|---|
| 2006/0174059 A1 | 8/2006 | Grantson et al. | |
| 2008/0184018 A1* | 7/2008 | Busck | G06F 9/3885 |
| | | | 712/E9.045 |
| 2008/0288730 A1* | 11/2008 | Heller, Jr. | G06F 12/0842 |
| | | | 711/147 |
| 2009/0265293 A1* | 10/2009 | Nicholas | G06F 12/0862 |
| | | | 706/45 |
| 2015/0089180 A1* | 3/2015 | Yamamura | G06F 12/023 |
| | | | 711/170 |
| 2016/0092236 A1* | 3/2016 | Kanapathipaillai | G06F 9/3857 |
| | | | 712/216 |
| 2019/0114422 A1* | 4/2019 | Johnson | G06F 21/52 |
| 2020/0159624 A1* | 5/2020 | Malkov | G06N 20/00 |
| 2020/0327225 A1* | 10/2020 | Nguyen | G06N 3/084 |
| 2020/0372129 A1* | 11/2020 | Gupta | G06F 9/3842 |

OTHER PUBLICATIONS

Jegou et al. Speculative Prefetching, proceedings of the 7th international conference on supercomputing, Aug. 1993 (Year: 1993).*

Li, Peinan et al., "Conditional Speculation: An Effective Approach to Safeguard Out-of-Order Execution Against Spectre Attacks," 2019 IEEE International Symposium on High Performance Computer Architecture (HPCA), Feb. 2019, pp. 264-276.

International Search Report and Written Opinion for PCT/EP2020/075363 dated Dec. 16, 2020, pp. 1-15.

IBM, "z/Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

FIG. 5B

FILTER RETAINS LAST N (32) *RETIRED* MEMORY ACCESSES IN EACH RANGE

502 — CONSTANTS
- M8 [ # 0x2dba8L ]
- M8 [ # 0x2f4c8L ]
- M8 [ # 0x2f4c0L ]
- M8 [ # 0x2f4a0L ]
- M8 [ # 0x2b8e8L ]
- M8 [ # 0x2b900L ]
- M8 [ # 0x2dca8L ]
- M8 [ # 0x2b918L ]
- M8 [ # 0x2b920L ]
- M8 [ # 0x2b928L ]
- M8 [ # 0x2e78L ]
- M8 [ # 0x2b930L ]
- M8 [ # 0x2e270L ]
- M8 [ # 0x2e2b8L ]
- M8 [ # 0x2e7f0L ]
- M8 [ # 0x2e578L ]
- M8 [ # 0x2e808L ]
- M8 [ # 0x2b938L ]
- M8 [ # 0x2b958L ]
- M8 [ # 0x2b968L ]
- M8 [ # 0x2e568L ]
- M8 [ # 0x2e7a0L ]
- M8 [ # 0x2e850L ]
- M8 [ # 0x2b970L ]
- M8 [ # 0x2e580L ]
- M8 [ # 0x2e548L ]
- M8 [ # 0x2e468L ]
- M8 [ # 0x2e368L ]
- M8 [ # 0x2e528L ]
- M8 [ # 0x2e768L ]
- M8 [ # 0x2d568L ]
- M8 [ # 0x2b568L ]

MIN: 2B568
MAX: 2F4C8

504 — STATIC
- M8 [ # 0x20000000000011c8 ]
- M8 [ # 0x20000000000016f8 ]
- M8 [ # 0x2000000000001700 ]
- M8 [ # 0x2000000000001708 ]
- M8 [ # 0x2000000000001710 ]
- M8 [ # 0x2000000000001718 ]
- M8 [ # 0x2000000000001720 ]
- M8 [ # 0x2000000000001728 ]
- M8 [ # 0x2000000000001730 ]
- M8 [ # 0x2000000000001738 ]
- M8 [ # 0x2000000000001740 ]
- M8 [ # 0x2000000000001748 ]
- M8 [ # 0x20000000000011d0 ]
- M8 [ # 0x2000000000001798 ]
- M8 [ # 0x20000000000017a0 ]
- M8 [ # 0x20000000000017a8 ]
- M8 [ # 0x20000000000017b0 ]
- M8 [ # 0x20000000000017b8 ]
- M8 [ # 0x20000000000017c0 ]
- M8 [ # 0x20000000000017c8 ]
- M8 [ # 0x20000000000017d0 ]
- M8 [ # 0x20000000000017d8 ]
- M8 [ # 0x20000000000017e0 ]
- M8 [ # 0x20000000000017e8 ]
- M8 [ # 0x20000000000011d8 ]
- M8 [ # 0x2000000000001838 ]
- M8 [ # 0x2000000000001840 ]
- M8 [ # 0x2000000000001848 ]
- M8 [ # 0x2000000000001850 ]
- M8 [ # 0x2000000000001858 ]
- M8 [ # 0x2000000000001860 ]
- M8 [ # 0x2000000000001868 ]

20000000000011c8
2000000000001868

506 — HEAP
- M8 [ # 0x4000000000000098 ]
- M8 [ # 0x40000000000000a0 ]
- M8 [ # 0x40000000000000a8 ]
- M8 [ # 0x40000000000000b0 ]
- M8 [ # 0x40000000000000b8 ]
- M8 [ # 0x40000000000000c0 ]
- M8 [ # 0x40000000000000c8 ]
- M8 [ # 0x40000000000000d0 ]
- M8 [ # 0x40000000000000d8 ]
- M8 [ # 0x40000000000000e0 ]
- M8 [ # 0x40000000000000e8 ]
- M8 [ # 0x40000000000000f0 ]
- M8 [ # 0x40000000000000f8 ]
- M8 [ # 0x4000000000000100 ]
- M8 [ # 0x4000000000000108 ]
- M8 [ # 0x4000000000000110 ]
- M8 [ # 0x4000000000000118 ]
- M8 [ # 0x4000000000000120 ]
- M8 [ # 0x4000000000000128 ]
- M8 [ # 0x4000000000000130 ]
- M8 [ # 0x4000000000000138 ]
- M8 [ # 0x4000000000000140 ]
- M8 [ # 0x4000000000000148 ]
- M8 [ # 0x4000000000000150 ]
- M8 [ # 0x4000000000000158 ]
- M8 [ # 0x4000000000000160 ]
- M8 [ # 0x4000000000000168 ]
- M8 [ # 0x4000000000000170 ]
- M8 [ # 0x4000000000000178 ]
- M8 [ # 0x4000000000000180 ]
- M8 [ # 0x4000000000000188 ]
- M8 [ # 0x4000000000000190 ]

4000000000000098
4000000000000190

508 — STACK
- M8 [ # 0x6000000000000108 ]
- M8 [ # 0x6000000000000100 ]
- M8 [ # 0x60000000000000f8 ]
- M8 [ # 0x60000000000000f0 ]
- M8 [ # 0x60000000000000e8 ]
- M8 [ # 0x60000000000000e0 ]
- M8 [ # 0x60000000000000d8 ]
- M8 [ # 0x60000000000000d0 ]
- M8 [ # 0x60000000000000c8 ]
- M8 [ # 0x60000000000000c0 ]
- M8 [ # 0x60000000000000b8 ]
- M8 [ # 0x60000000000000b0 ]
- M8 [ # 0x60000000000000a8 ]
- M8 [ # 0x60000000000000a0 ]
- M8 [ # 0x6000000000000098 ]
- M8 [ # 0x6000000000000090 ]
- M8 [ # 0x6000000000000088 ]
- M8 [ # 0x6000000000000080 ]
- M8 [ # 0x6000000000000078 ]
- M8 [ # 0x6000000000000070 ]
- M8 [ # 0x6000000000000068 ]
- M8 [ # 0x6000000000000060 ]
- M8 [ # 0x6000000000000058 ]
- M8 [ # 0x6000000000000050 ]
- M8 [ # 0x6000000000000048 ]
- M8 [ # 0x6000000000000040 ]
- M8 [ # 0x6000000000000038 ]
- M8 [ # 0x6000000000000030 ]
- M8 [ # 0x6000000000000028 ]
- M8 [ # 0x6000000000000020 ]
- M8 [ # 0x6000000000000018 ]
- M8 [ # 0x6000000000000010 ]

6000000000000010
6000000000000108

DETERMINE WHETHER A SELECTED EVENT OF THE COMPUTING ENVIRONMENT IS CONSISTENT WITH A HISTORICAL PATTERN OF SELECTED EVENTS OF THE COMPUTING ENVIRONMENT ~700

DELAY PROCESSING ASSOCIATED WITH THE SELECTED EVENT, BASED ON DETERMINING THAT THE SELECTED EVENT IS INCONSISTENT WITH THE HISTORICAL PATTERN OF SELECTED EVENTS ~702

DETERMINE, BASED ON DELAYING PROCESSING ASSOCIATED WITH THE SELECTED EVENT, WHETHER THE SELECTED EVENT IS VALID ~704

RESUME PROCESSING ASSOCIATED WITH THE SELECTED EVENT, BASED ON DETERMINING THAT THE SELECTED EVENT IS VALID ~706

THE SELECTED EVENT IS A MEMORY ACCESS REQUESTED BY A PROGRAM OF THE COMPUTING ENVIRONMENT AND THE HISTORICAL PATTERN OF SELECTED EVENTS INCLUDES MEMORY ACCESSES PERFORMED BY ANOTHER PROGRAM OF THE COMPUTING ENVIRONMENT ~708

THE DETERMINING WHETHER THE SELECTED EVENT IS CONSISTENT WITH THE HISTORICAL PATTERN INCLUDES DETERMINING WHETHER THE MEMORY ACCESS IS FOR AN ADDRESS WITHIN A RANGE OF ADDRESSES DEFINED BY THE HISTORICAL PATTERN OF SELECTED EVENTS OR WITHIN A PREDEFINED DEVIATION FROM THE RANGE OF ADDRESSES DEFINED BY THE HISTORICAL PATTERN OF SELECTED EVENTS ~710

THE SELECTED EVENT IS CONSISTENT WITH THE HISTORICAL PATTERN BASED ON THE ADDRESS BEING WITHIN THE RANGE OF ADDRESSES DEFINED BY THE HISTORICAL PATTERN OF SELECTED EVENTS OR WITHIN THE PREDEFINED DEVIATION FROM THE RANGE OF ADDRESSES DEFINED BY THE HISTORICAL PATTERN OF SELECTED EVENTS ~712

THE DETERMINING WHETHER THE EVENT IS CONSISTENT WITH THE HISTORICAL PATTERN INCLUDES DETERMINING WHETHER THE SELECTED EVENT IS CONSISTENT WITH A HISTORY OF STRIDES ~714

FIG. 7A

MAINTAINING A DATA STRUCTURE THAT INCLUDES INFORMATION RELATING TO THE HISTORICAL PATTERN OF SELECTED EVENTS —716

THE HISTORICAL PATTERN OF SELECTED EVENTS INCLUDES MEMORY ACCESSES AND THE DATA STRUCTURE INCLUDES ADDRESSES ACCESSED BY THE MEMORY ACCESSES —718

THE DATA STRUCTURE INCLUDES A CONFIGURABLE NUMBER OF LAST VERIFIED DATA LOAD ADDRESSES —720

A DATA LOAD ADDRESS IS VERIFIED BASED ON AN INSTRUCTION INITIATING A LOAD SPECULATIVELY SUCCESSFULLY RETIRING —722

THE LAST VERIFIED DATA LOAD ADDRESSES INCLUDE A LOWER BOUND ADDRESS AND AN UPPER BOUND ADDRESS —724

THE SELECTED EVENT INCLUDES A MEMORY ACCESS SPECIFIED BY A LOAD INSTRUCTION ISSUED DURING SPECULATIVE EXECUTION —726

THE DETERMINING WHETHER THE SELECTED EVENT IS CONSISTENT WITH THE HISTORICAL PATTERN OF SELECTED EVENTS INCLUDES DETERMINING, BASED ON OBTAINING THE LOAD INSTRUCTION DURING SPECULATIVE EXECUTION, WHETHER A LOAD ADDRESS OF THE LOAD INSTRUCTION IS WITHIN THE LOWER BOUND ADDRESS AND THE UPPER BOUND ADDRESS OR WITHIN A PREDEFINED DEVIATION FROM A RANGE OF ADDRESSES DEFINED BY THE LOWER BOUND ADDRESS AND THE UPPER BOUND ADDRESS —728

THE SELECTED EVENT IS CONSISTENT WITH THE HISTORICAL PATTERN OF SELECTED EVENTS, BASED ON THE LOAD ADDRESS BEING WITHIN THE LOWER BOUND ADDRESS AND THE UPPER BOUND ADDRESS OR WITHIN THE PREDEFINED DEVIATION FROM THE RANGE OF ADDRESSES —730

THE DELAYING PROCESSING INCLUDES DELAYING EXECUTION OF THE LOAD INSTRUCTION IN SPECULATIVE EXECUTION —732

THE RESUMING PROCESSING INCLUDES EXECUTING THE LOAD INSTRUCTION BASED ON DETERMINING THAT THE SELECTED EVENT IS VALID —734

FIG. 7B

PREVENTING SELECTIVE EVENTS OF A COMPUTING ENVIRONMENT

BACKGROUND

One or more aspects relate, in general, to processing within a computing environment, and in particular, to facilitating such processing.

To improve processing, modern processors include speculative and/or out-of-order processing. During speculative processing, one or more tasks are performed prior to being known whether they will be needed during processing. This minimizes delays, if it is determined that the tasks are needed. Further, with out-of-order processing, certain tasks are performed out of sequential order and results of the tasks are held until the proper time during processing.

During speculative and/or out-of-order processing, certain vulnerabilities exist. There are various forms of vulnerabilities including, for instance, exploitation of conditional branches based on untrusted data, such as a value passed as a function argument or read from a file, etc. This vulnerability typically arises by way of an array access for which the untrusted value is used as part of an array index, which is forced into an out-of-bounds condition during speculative execution.

Another form of vulnerability includes corrupting a branch target prediction that processors use to predictively execute code following an indirect branch, without waiting for the actual branch target to be resolved. Through malicious training, the processor can be induced to jump to a targeted location, in which code is executed that causes cache lines to be loaded that would not otherwise be loaded in normal execution. Other forms of vulnerabilities also exist.

With these vulnerabilities, cache lines may be loaded that would not have been loaded during normal program execution. A process is coerced into performing operations that would not otherwise be performed and which have stateful effects on a processor, typically through the cache footprint, which can be detected by a malicious program and used to leak information.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes determining whether a selected event of a computing environment is consistent with a historical pattern of selected events of the computing environment. Based on determining that the selected event is inconsistent with the historical pattern of selected events, processing associated with the selected event is delayed. Based on delaying processing associated with the selected event, a determination is made as to whether the selected event is valid. Based on determining that the selected event is valid, processing associated with the selected event is resumed.

By delaying the event considered to be inconsistent until it is determined to be valid, malicious events are prevented.

As an example, the selected event is a memory access and the historical pattern of selected events is a pattern of memory accesses. For instance, the selected event is a memory access requested by a program of the computing environment and the historical pattern of selected events includes memory accesses performed by another program of the computing environment. By delaying processing associated with a memory access based on determining the memory access is inconsistent with a historical pattern of memory accesses, potential malicious memory accesses are prevented. This prevents unwanted leaks of information, as well.

In one example, the determining whether the selected event is consistent with the historical pattern includes determining whether the memory access is for an address within a range of addresses defined by the historical pattern of selected events or within a predefined deviation from the range of addresses defined by the historical pattern of selected events. The selected event is consistent with the historical pattern based on the address being within the range of addresses defined by the historical pattern of selected events or within the predefined deviation from the range of addresses defined by the historical pattern of selected events. This provides an efficient mechanism for determining whether a selected event is consistent with the historical pattern, and for, at least, delaying events which may be undesirable.

In another example, the determining whether the event is consistent with the historical pattern includes determining whether the selected event is consistent with a history of strides.

In one embodiment, a data structure that includes information relating to the historical pattern of selected events is maintained. For example, the historical pattern of selected events includes memory accesses and the data structure includes addresses accessed by the memory accesses. The data structure includes, for instance, a configurable number of last verified data load addresses. A data load address is verified, for instance, based on an instruction initiating a load speculatively successfully retiring. In one example, the last verified data load addresses include a lower bound address and an upper bound address.

As one example, the selected event includes a memory access specified by a load instruction issued during speculative execution. The determining whether the selected event is consistent with the historical pattern of selected events includes determining, based on obtaining the load instruction during speculative execution, whether a load address of the load instruction is within the lower bound address and the upper bound address or within a predefined deviation from a range of addresses defined by the lower bound address and the upper bound address. The selected event is consistent with the historical pattern of selected events, based on the load address being within the lower bound address and the upper bound address or within the predefined deviation from the range of addresses. The delaying processing includes, for example, delaying execution of the load instruction in speculative execution, and the resuming processing includes, for instance, executing the load instruction based on determining the selected event is valid (e.g., speculation was correct).

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 5B depicts one example of an indication of accesses retained by the filter of FIG. 5A, in accordance with an aspect of the present invention;

FIGS. 7A-7B depict one example of facilitating processing in accordance with an aspect of the present invention;

DETAILED DESCRIPTION

Figure 1:
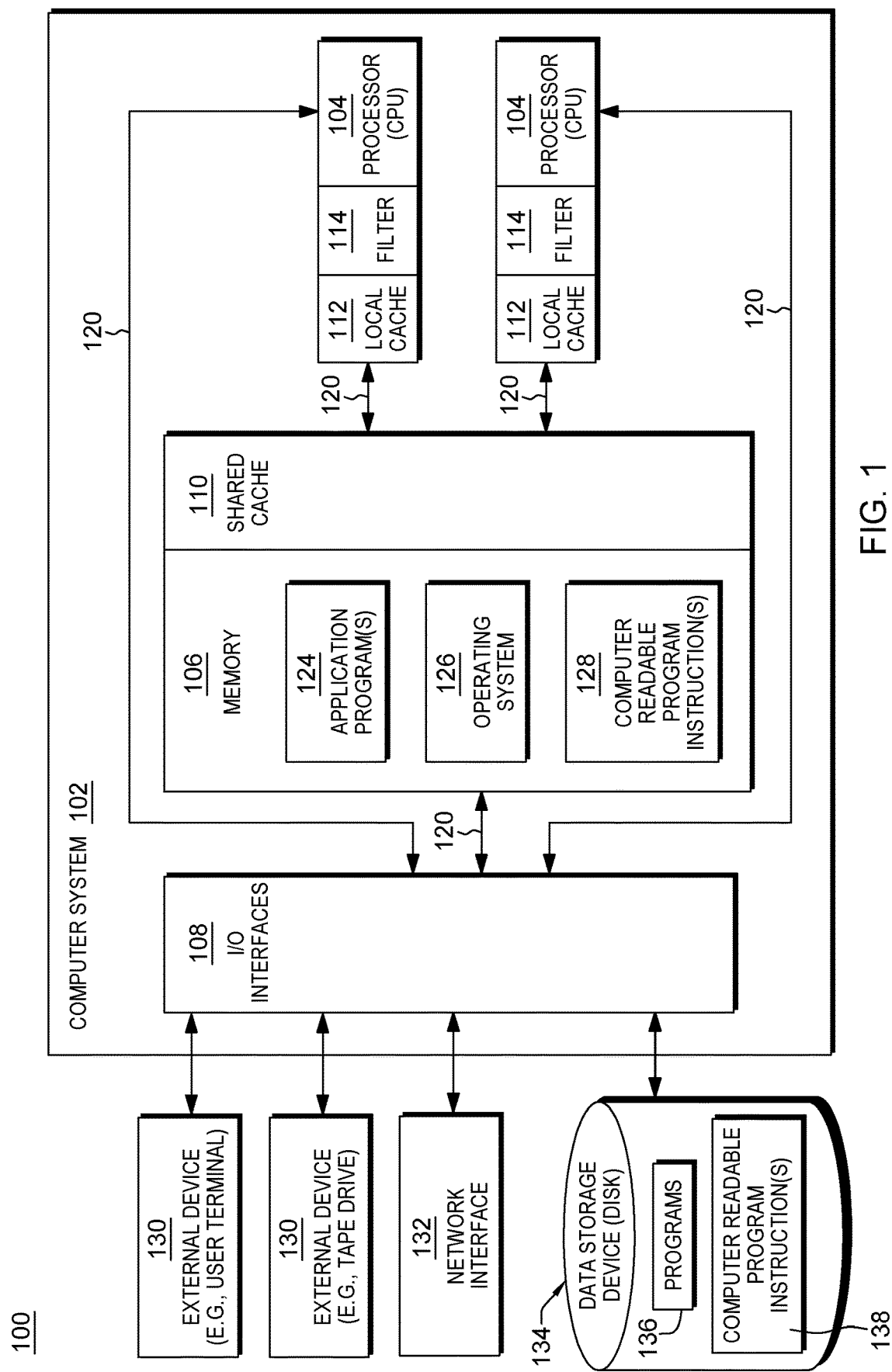
FIG. 1 depicts one example of a computing environment to incorporate and use one or more aspects of the present invention.

In accordance with an aspect of the present invention, a capability is provided to determine whether an event to be performed within a computing environment is suspicious and therefore, should be delayed until determined that it is valid. As an example, normal execution flow results in an expected pattern of events (e.g., memory accesses (a.k.a., data accesses), input/output (I/O) events, disk accesses, etc.). If an event is initiated that is inconsistent with the pattern (e.g., the history of program execution), that event is detected and at least temporarily delayed in processing. Further checks are performed to determine whether the event is valid. Should it be determined that the event is valid, the event is performed; otherwise, it is terminated and/or discarded.

One example of an event to be monitored and potentially delayed is a memory access, such as a cache access. Based on obtaining a memory access, a determination is made as to whether the access is suspicious (e.g., inconsistent with a pattern of accesses previously performed). Based on a determination that the access is suspicious, the access is at least temporarily delayed until it is determined whether the access is valid. If it is determined that the access is valid, it is performed; otherwise, it is discarded. This detects and prevents malicious or unwanted data accesses of, e.g., a cache.

Although one or more examples described herein are with respect to memory accesses, such as cache accesses, other types of events may be detected and at least temporarily delayed, including, but not limited to, input/output (I/O) events, disk accesses, etc.

In one example, an observation is made that the data accesses that a program makes in normal operation have a predictable level of entropy. That is, at any given moment in time, the data accesses a program can be expected to make in the future will normally be in the same basic pattern that it has made in the past. This pattern of accesses can be recorded and monitored, and any significant deviation that is attempted during, e.g., speculative execution, can be stopped at the point where it would cause a cache line to be loaded. Thus, if, for instance, loading a cache line during speculation would be consistent with the expected access pattern, then it is permitted. Otherwise, speculation would be paused until it is known that the current access will not be discarded, i.e., it is guaranteed to be successfully retired as part of the non-speculative execution path.

In one aspect, the capability includes a filter used to selectively allow an event, such as a memory access to a cache. The filter may be hardware, software, firmware, and/or any combination thereof. Further, it may be placed in one or more locations within a processing path. In one example, in which the event is a cache access, the filter is coupled to the cache (e.g., a local cache) of a processor and the processor.

As used herein, firmware includes, e.g., the microcode of the processor and/or the system. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

One or more aspects of the present invention protect against data leaks caused by coerced memory accesses. For instance, the filter is designed to detect and prevent, at least temporarily, certain accesses (e.g., those that are outside a pattern of accesses or an acceptable deviation therefrom). By preventing the accesses, detectable state changes in, e.g., loaded cache lines are also prevented, avoiding unwanted information leakage.

One embodiment of a computing environment to incorporate and use one or more aspects of the present invention is described with reference to FIG. 1. In one example, the computing environment is based on the z/Architecture® hardware architecture, offered by International Business Machines Corporation, Armonk, N.Y. One embodiment of the z/Architecture hardware architecture is described in "z/Architecture Principles of Operation," IBM Publication No. SA22-7832-11, Twelfth Edition, September 2017, which is hereby incorporated herein by reference in its entirety. IBM and Z/ARCHITECTURE are registered trademarks of International Business Machines Corporation in at least one jurisdiction.

As shown in FIG. 1, a computing environment 100 includes, for instance, a computer system 102 shown, e.g., in the form of a computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 120.

Bus 120 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 110, such as a shared cache, which may be coupled to local caches 112 of processors 104. In accordance with an aspect of the present invention, a filter 114 is coupled to local cache 112 and processor 104 and used to detect and prevent selected events, such as malicious data accesses.

Further, memory 106 may include one or more programs or applications 124, an operating system 126, and one or more computer readable program instructions 128. Computer readable program instructions 128 may be configured to carry out functions of embodiments of aspects of the invention.

Computer system 102 may also communicate via, e.g., I/O interfaces 108 with one or more external devices 130, one or more network interfaces 132, and/or one or more data storage devices 134. Example external devices include a user terminal, a tape drive, a pointing device, a display, etc. Network interface 132 enables computer system 102 to communicate with one or more networks, such as a local area network (LAN), a general wide area network (WAN), and/or a public network (e.g., the Internet), providing communication with other computing devices or systems.

Data storage device 134 (a particular example of an external device) may store one or more programs 136, one or more computer readable program instructions 138, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples include, but are not limited to: microcode, device drivers, redundant processing units, external disk drive arrays, RAID systems, tape drives, and data archival storage systems, etc.

Computer system 102 may be operational with numerous other computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In accordance with an aspect of the present invention, a processor, such as processor 104, executes one or more programs or applications (e.g., applications 124) that request data accesses (e.g., in one or more levels of memory—main memory and/or one or more levels of cache). A sequence of data accesses that a program makes during normal operation can be expected to have some natural level of entropy. Data accesses look like random events, and a sequence of random events has a number associated with it called an entropy. As an example, information entropy is a measure of information content of a random variable. For instance:

$$H(S) = -\sum_i p(s_i) \log_2 p(s_i)$$

It is a logarithmic measure of how surprising any given value is. Here, $p(s_i)$ is the probability of event $S_i$. In one example, the unit of measurement is bits—the average number of bits to be used to express each possible value uniquely. Other units of measurement may also be used.

Malicious speculative loads represent detectable noise or distortion in a sequence with an otherwise expected level of entropy. Consider the following canonical example:

```
unsigned int array1_size = 16;
uint8_t unused1[64];
uint8_t array1[160] = {1, 2, 3, 4, 5, 6, 7, 8, 9, 10, 11, 12, 13, 14, 15, 16};
uint8_t unused2[64];
unit8_t array2[256 * 512];
volatile int flag = 0;
...
void victim_function(size_t x) -- out-of-bounds x-out of cache units into other memory--{
If (x < array1_size) {
    array2[array1[x] * 512] = 1; -- executed speculatively --
    }
}
```

In the above example, it is conspired to provide values for x that are outside the tested-for bounds of array1_size. These values for x fail a bounds check (e.g., within an upper and lower bounds of addresses or within a predefined deviation therefrom), but not before speculative execution causes the body of the conditional code to be executed, resulting in the load of array1[x], which could address essentially any data byte in the program. In normal operation of the program, the values of x range from, e.g., 1 to 16. A value of x outside of this range would be unexpected and could be detectable as a spike of noise or distortion. With out-of-bounds x, a cache line is loaded corresponding to a byte value that should not have been accessed. Repeating this with different x's can sweep through the memory, leaking memory at approximately, e.g., 10 KB/sec.

To detect and/or prevent the above accesses and/or data leakage, a filter is provided, in accordance with an aspect of the present invention. The filter is, for instance, a low-pass filter on memory access unpredictability. For memory accesses, an upper limit of the filter is the degree of variance on a memory access pattern that is determined to be the limit to subvert the action of malicious speculative execution. For other types of events, the low-pass filter can detect and prevent those events and have upper limits corresponding thereto. For instance, in signal processing, a low-pass filter can be used for prevention of signal aliasing, where the upper limit of the filter is set at or below a selected frequency level. Other examples are possible.

In one example of a filter used for memory accesses, a data structure (e.g., table) of the last n verified data load addresses is maintained. Verified indicates, for instance, that the instruction that initiated the load, if done speculatively, has been successfully retired. The number n can be any practicable number, such as 20 or another selected number. The addresses recorded in the table will have a lower bound and an upper bound. New loads during speculative execution will be permitted if they fall within these bounds or, if outside of the bounds, deviate from the lower or upper bound by a predefined deviation, such as a magnitude of no more than m. The delta m is chosen, in one example, to keep entropy low while minimally impacting overall performance.

If the low-pass filter does not permit a load during speculative execution, then speculation is paused at that point. The load is allowed to proceed when the execution path it lies in has been proven as valid (i.e., whatever condition that controls it has been confirmed).

Further details regarding the filter and entropy are described with reference to FIGS. 2-4B. In these examples, the events are memory accesses; however, other events may be similarly represented.

Figure 2:
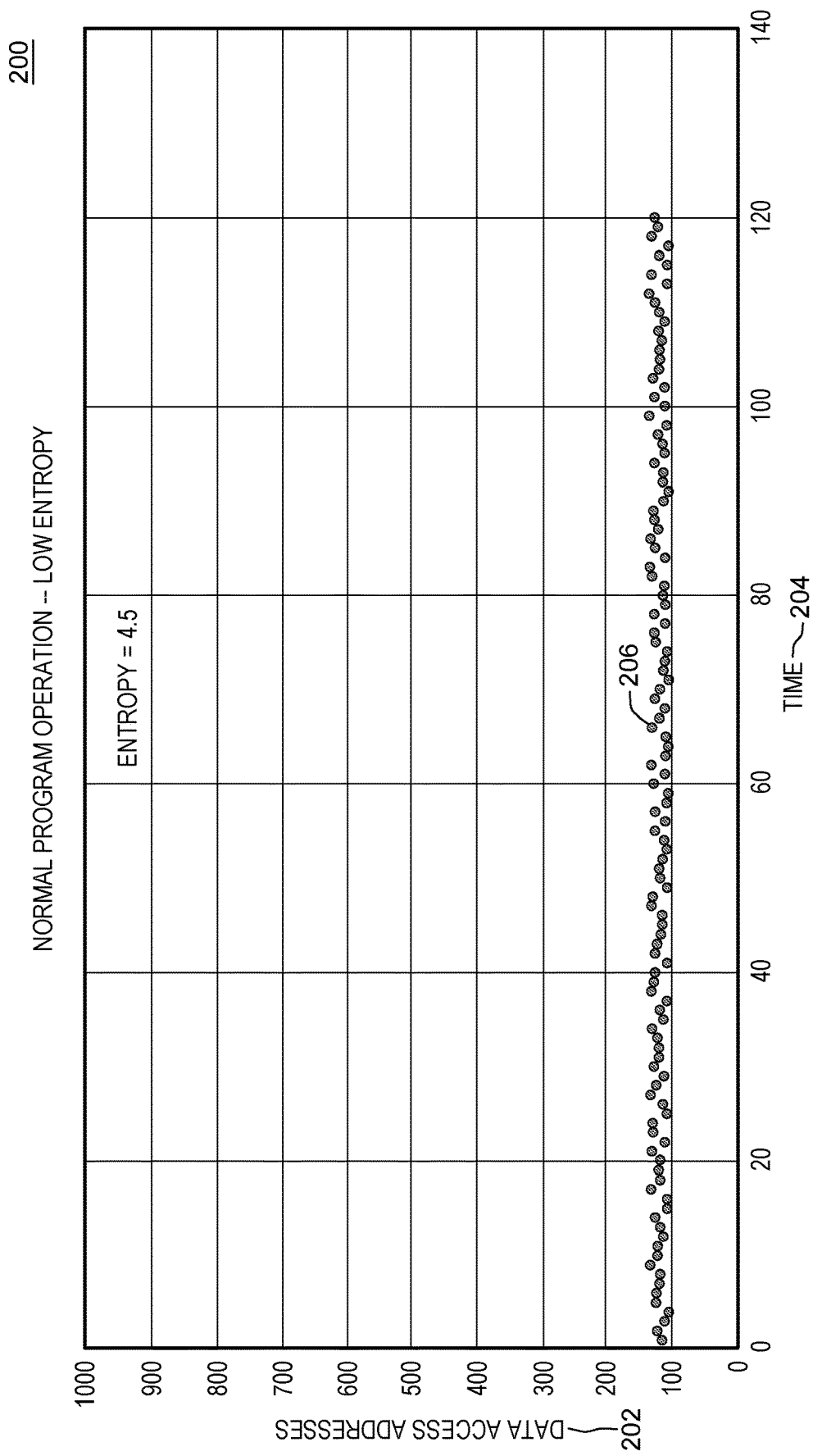
FIG. 2 depicts one example of data accesses during normal program operation, in accordance with one or more aspects of the present invention.

One example of a graph depicting data accesses during normal operation of a program is depicted in FIG. 2. As shown, a graph 200 includes data access addresses 202 on the y axis of the graph and time 204 on the x access of the graph. The circles 206 represent data accesses at the indicated addresses at the selected times. In this example, the entropy for the data accesses is 4.5, which is considered a low entropy.

Figure 3:
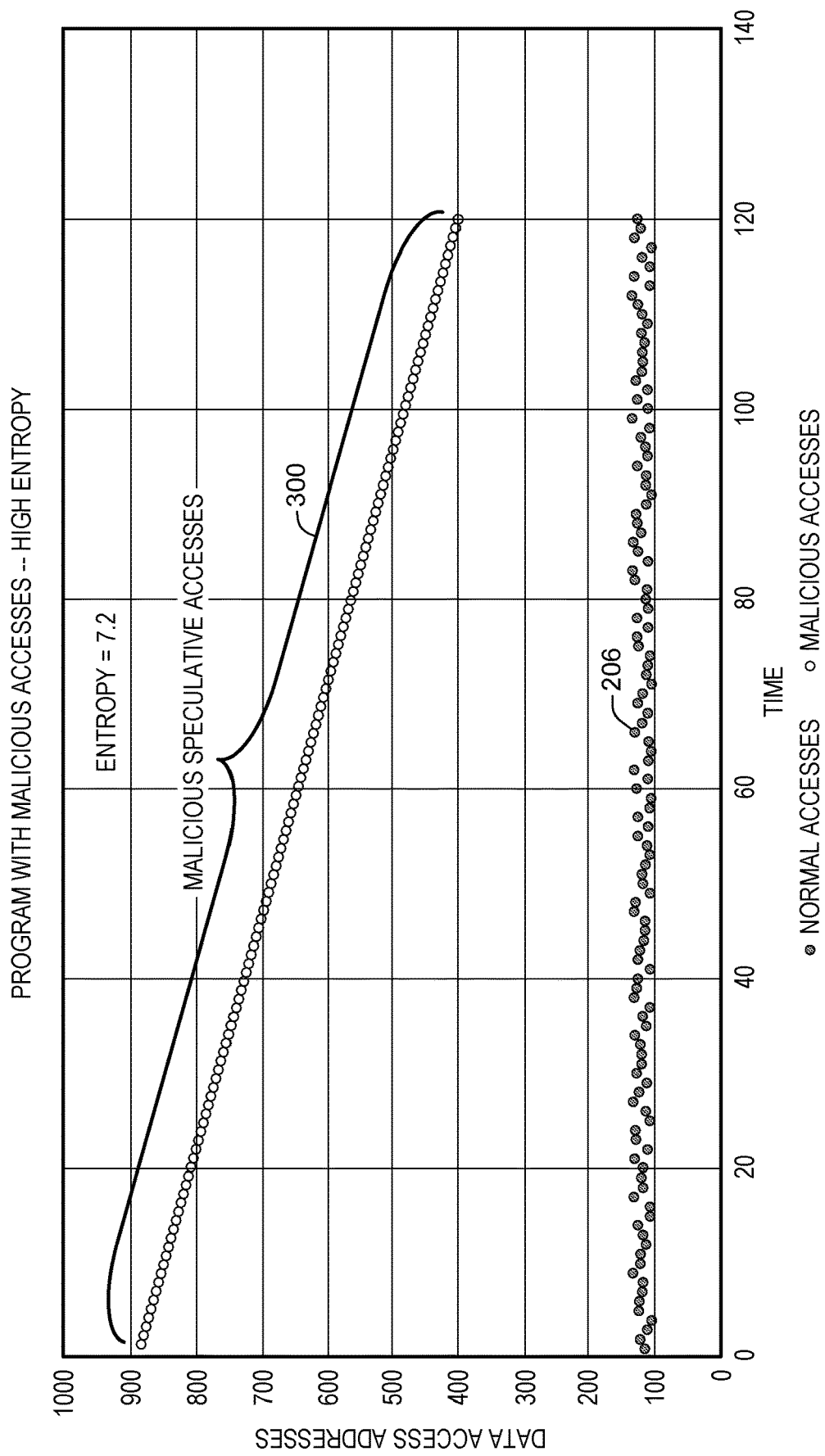
FIG. 3 depicts one example of malicious data accesses, in accordance with one or more aspects of the present invention.

When a program suffers from malicious accesses, by, for instance, another program executing in the processor or another processor, cache lines are loaded that otherwise would not be loaded. This is depicted in FIG. 3, which shows normal accesses 206 by one program and malicious speculative accesses 300 by another program. With this, the entropy number is higher than the normal entropy value. For instance, in this example, the entropy is 7.2, which is considered a high entropy when compared to the normal entropy (e.g., 4.5). Other examples exist.

Figure 4A:
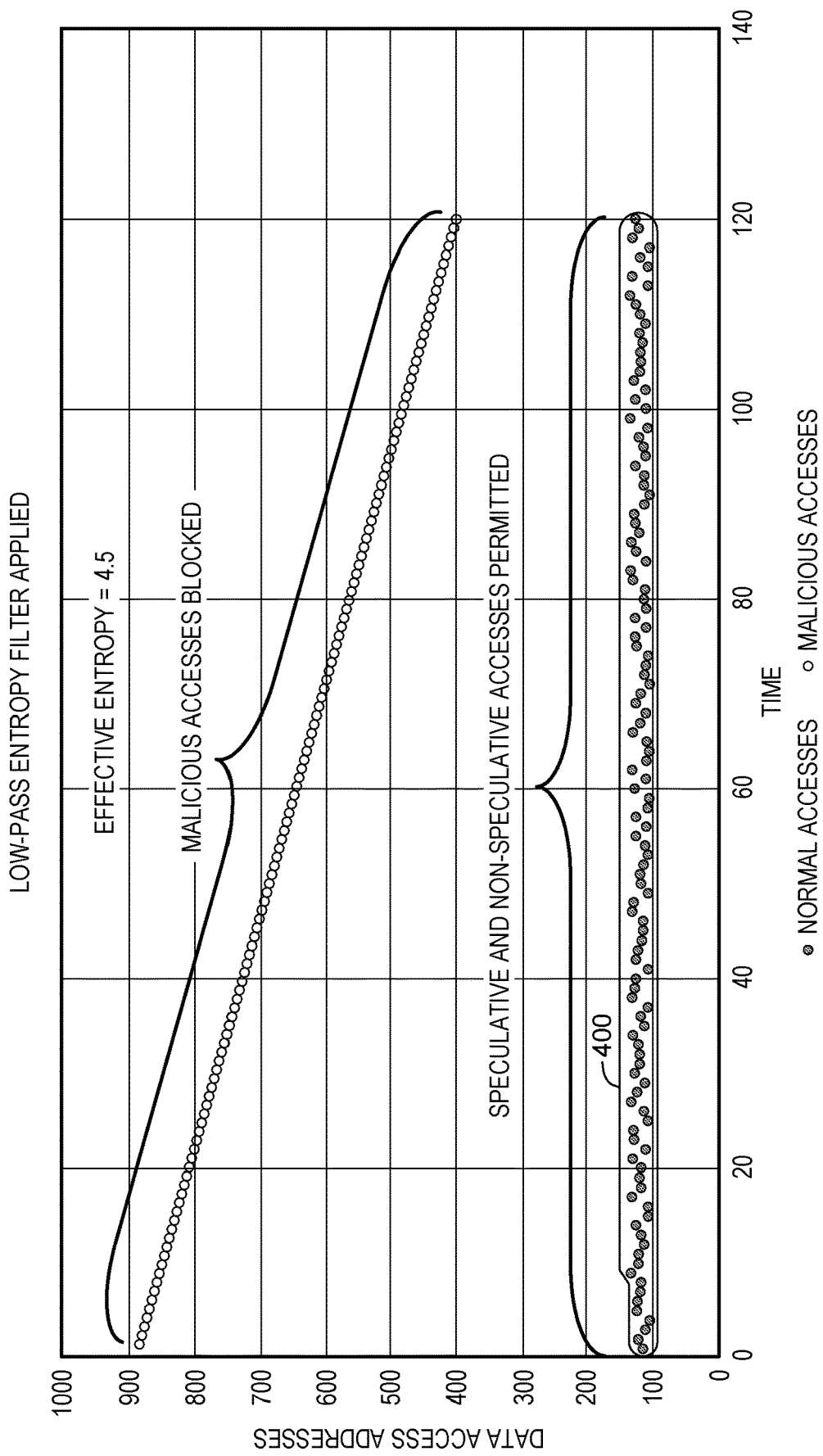
FIG. 4A depicts one example of applying a filter to detect and prevent malicious data accesses, in accordance with an aspect of the present invention.

In accordance with an aspect of the present invention, a filter is applied, as shown in FIG. 4A. Normal accesses are included in a defined region, referred to as an envelope 400. A program is expected to access memory in the defined region. If an access is determined to be outside of the defined region, it is considered suspicious and prevented until determined to be valid. By using the filter to perform the access or prevent the access, the effective entropy is, e.g., 4.5. It is shown that by using one or more aspects of the present invention, malicious accesses (e.g., actual and/or suspected malicious accesses) are prevented and the effective entropy when the filter is applied is the same as the entropy for normal accesses, e.g., 4.5.

Figure 4B:
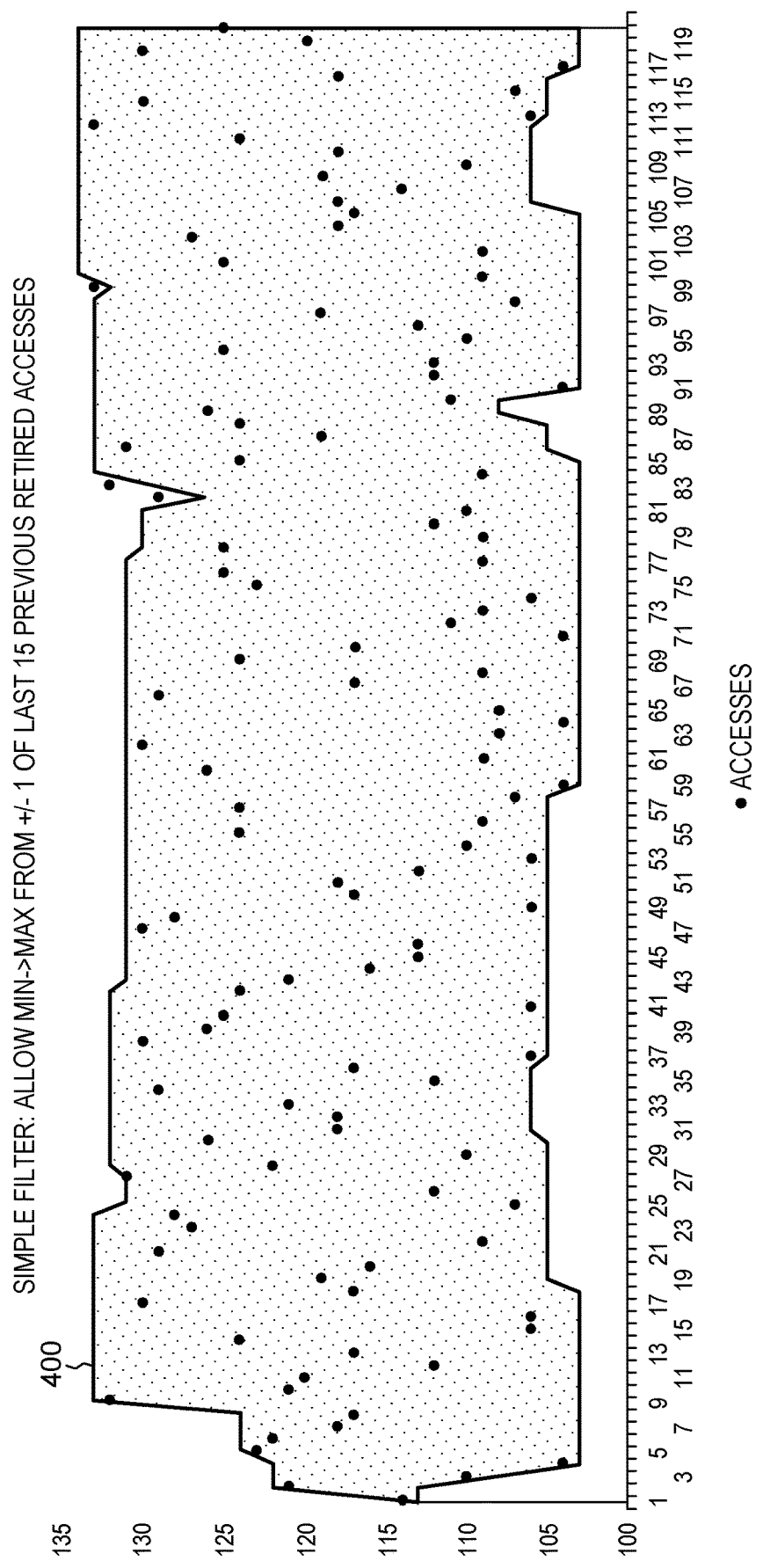
FIG. 4B depicts one example of results from applying the filter, in accordance with an aspect of the present invention.

Further details regarding envelope 400 are discussed with reference to FIG. 4B. In FIG. 4B, the envelope is enhanced for clarity. In this particular example, the filter maintains a history of the last n (e.g., 15) retired accesses +/−1 (or another configurable number). Within the min/max range of the 15 accesses +/−1, speculative accesses are permitted. Otherwise, they are prevented, at least temporarily (i.e., until they can be verified as valid).

Figure 5A:
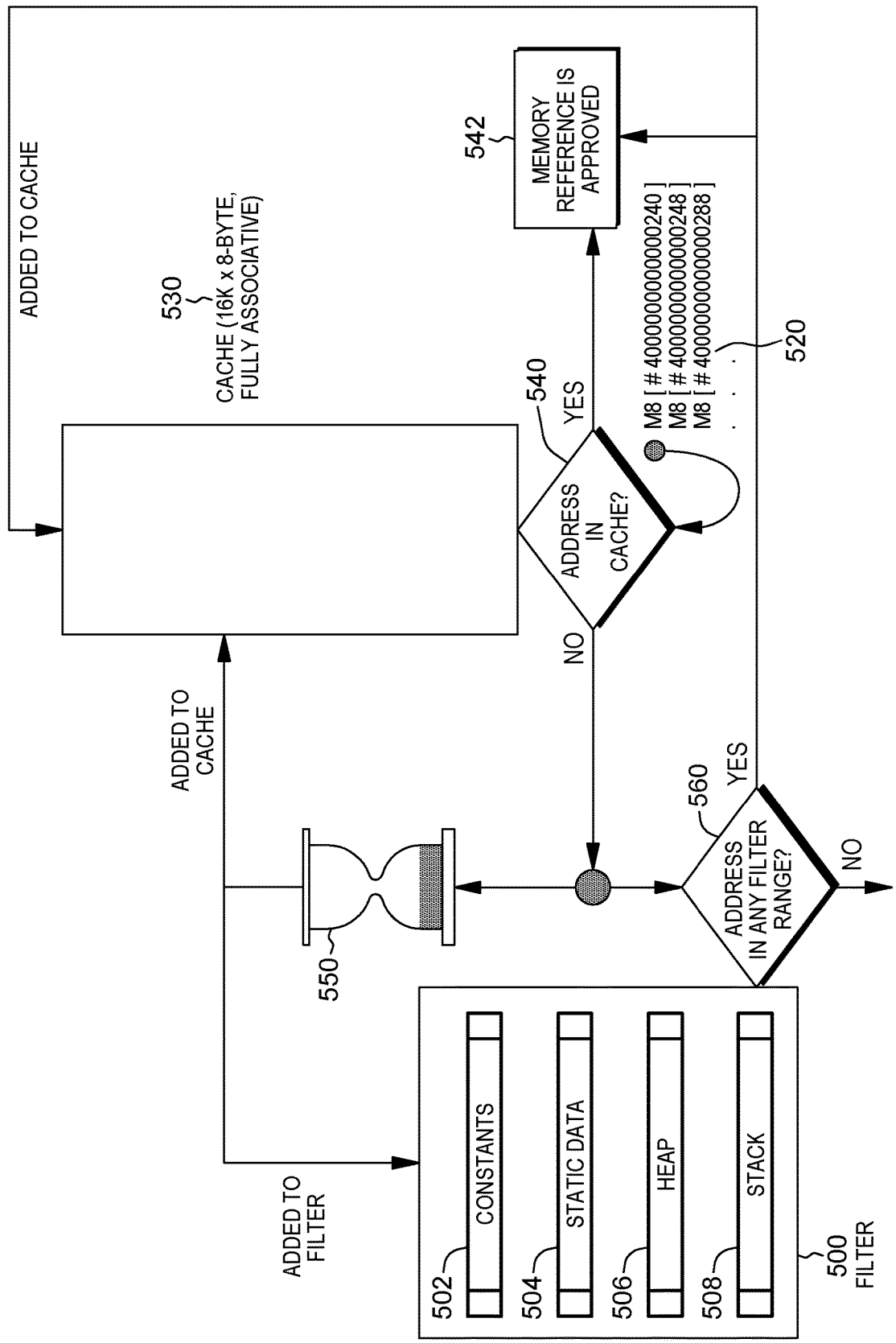
FIG. 5A depicts one example of using a filter to detect and prevent malicious accesses, in accordance with an aspect of the present invention.

One example of using a filter to detect and prevent malicious data accesses is described with reference to FIGS. 5A-5B. In this example, a filter 500 includes a history of the last n (e.g., 32) retired constants 502, static data 504, heap accesses 506, and stack accesses 508, each of which is further depicted in FIG. 5B. Returning to FIG. 5A, a processor issues (e.g., based on executing instruction(s), such as load instructions) one or more accesses 520 to a cache, such as a local cache 530. The processor determines 540 whether a requested access indicates an address in the cache. If the address is in the cache, the memory reference is approved 542. However, if the address is not in the cache, in one example, the processor waits 550 for a determination that the address is to be added to the cache (e.g., cache 530). For instance, the filter determines 560 if the address is in a range of addresses within the filter (or within a predefined deviation thereof). If the address is in the filter range of addresses (or within a predefined deviation thereof), the memory reference is approved 542 and the address is added to cache 530 and optionally, to filter 500 (e.g., if access is retired); otherwise, the reference is deferred 562. For instance, it is deferred until the access is validated (e.g., access is retired as part of non-speculative execution).

Further details regarding determining whether an event, such as a memory access, is to be permitted are described with reference to FIGS. 6A-6B. The processing of FIGS. 6A-6B may be performed by one or more components of a computing environment, such as computing environment 100, and include a filter, such as filter 114, filter 500 and/or another filter of the computing environment.

Figure 6A:
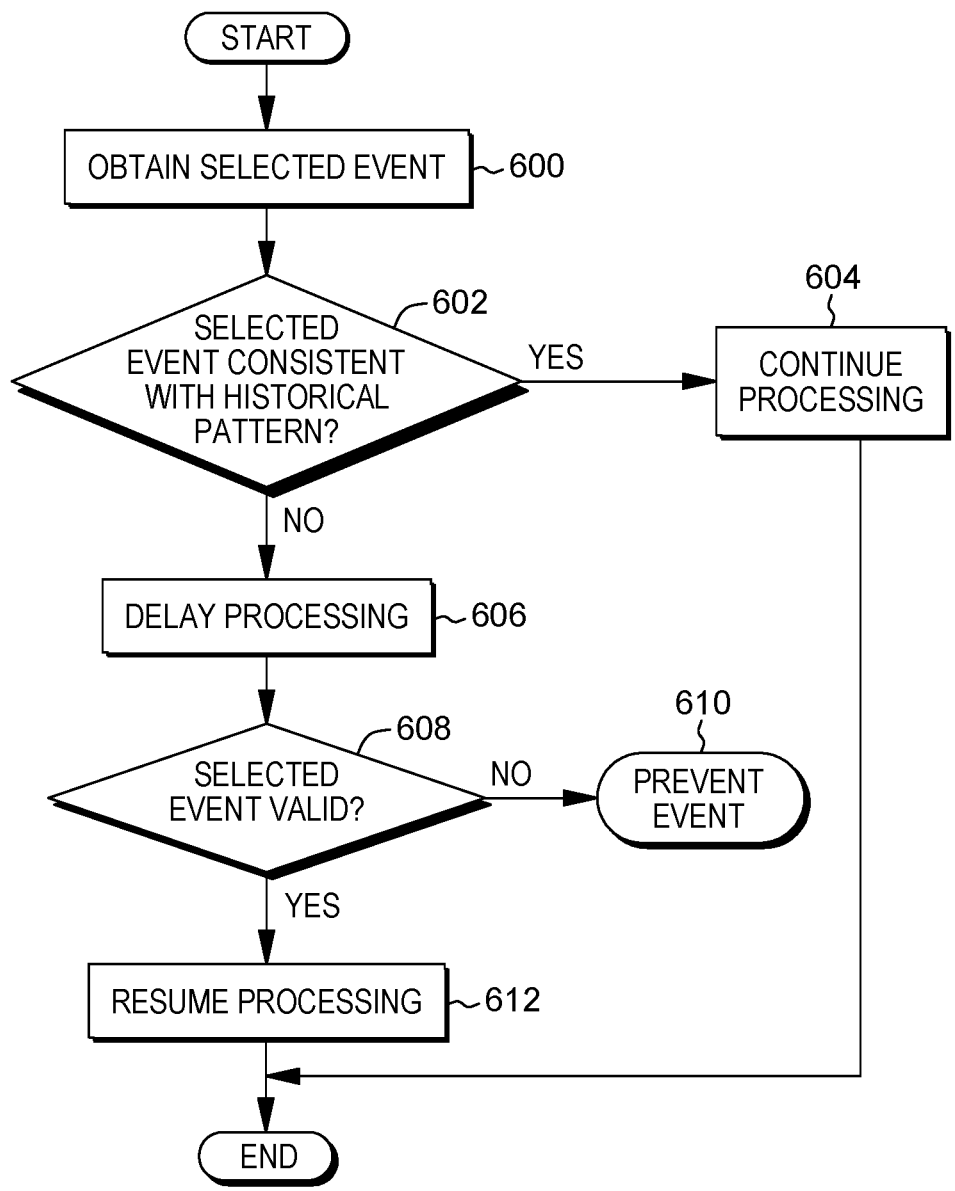
FIGS. 6A-6B depict examples of processing associated with applying a filter to minimize malicious events, in accordance with an aspect of present invention.

Referring initially to FIG. 6A, a selected event is obtained (e.g., received, provided, pulled, etc.) by, e.g., the filter, STEP 600. The filter, as an example, determines whether the selected event is consistent with a historical pattern of such events of the computing environment, INQUIRY 602. For instance, a determination is made as to whether the I/O event, disk access, memory access or other type of event is represented within the historical pattern of that event or a predefined deviation therefrom. If it is determined that the selected event is consistent with the historical pattern, then processing associated with the event is continued, STEP 604. For instance, the access or I/O event, etc. is performed.

However, if it is determined that the selected event is inconsistent with the historical pattern, then processing is delayed, STEP 606. For instance, the event is stalled until is determined whether the event is valid.

A determination is made as to whether the event is valid, based on a set of one or more conditions, INQUIRY 608. These conditions depend on the event being performed. For instance, if it is a memory access based on speculative execution, the event is determined valid when speculative execution ends, and the access is to be performed during non-speculative execution. Many other examples exist.

If the event is determined to be invalid, the event is prevented, STEP 610. For instance, the event is terminated or discarded. However, if the event is determined to be valid, processing of the event is resumed, STEP 612. For instance, the memory access is performed or the I/O event takes place, etc.

Further details relating to using the filter for a specific example of preventing malicious memory accesses of a local cache, such as local cache 112 or cache 530, are described with reference to FIG. 6B. In this particular example, the processing is performed by one or more components of a computing environment, such as computing environment 100, including a filter, such as filter 114 or filter 500.

Figure 6B:
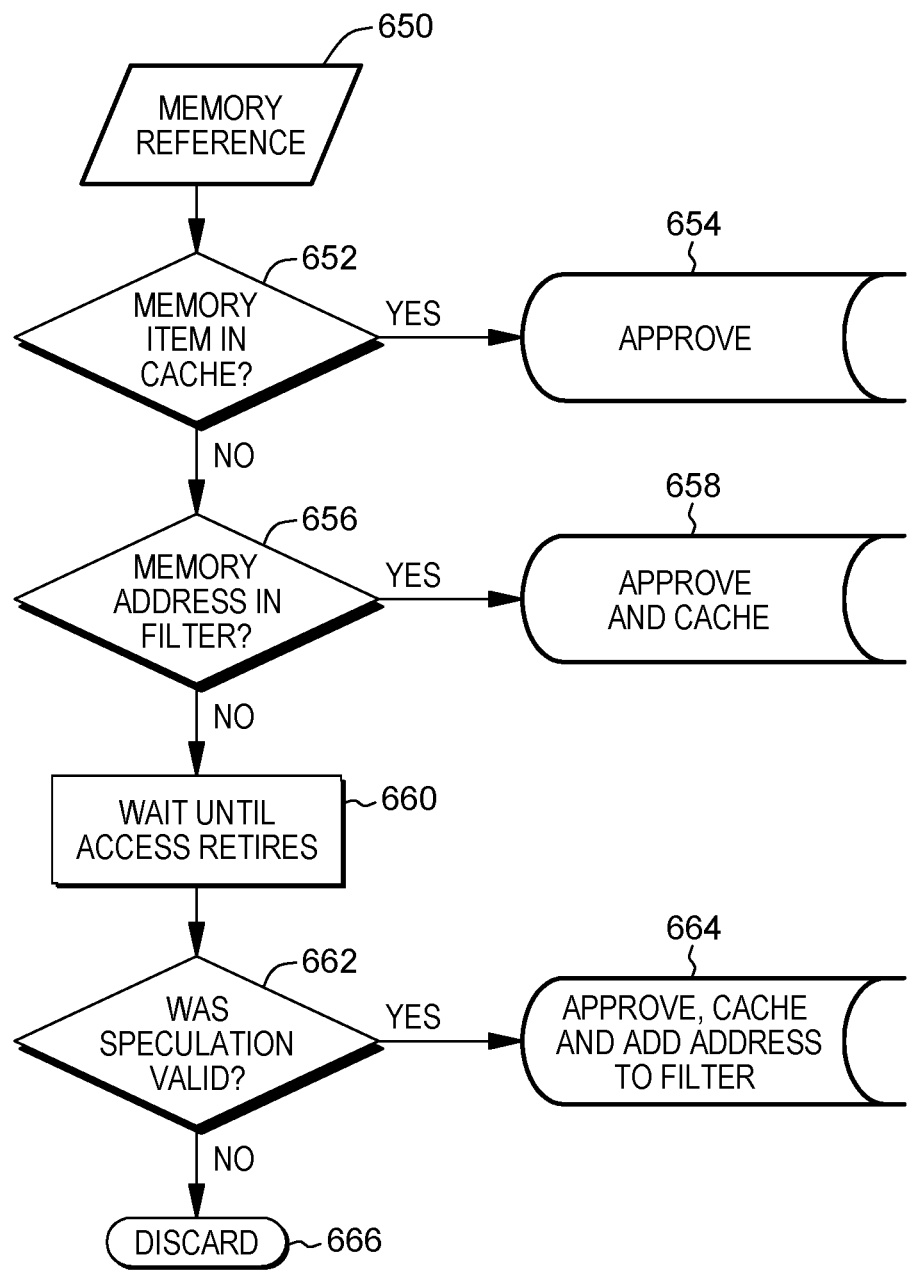

Referring to FIG. 6B, in one example, a memory reference is obtained (e.g., received, provided, pulled, etc.) by a component of the computing environment, such as by a caching mechanism, e.g., cache 112 or cache 530, STEP 650. The memory reference is obtained based on, for instance, a processor of the computing environment (e.g., processor 104) executing an instruction, such as a load instruction.

A determination is made, by e.g., the caching mechanism, as to whether the memory item is in the cache (e.g., cache 112, cache 530), INQUIRY 652. If it is in the cache, the memory reference is approved, and the access is performed, STEP 654. However, if the memory item is not in the cache, then the filter (e.g., filter 114, 500) determines whether the memory address is in the filter, INQUIRY 656. For instance, a determination is made as to whether the address is within the lower and upper bounds of the addresses in a data structure (e.g., table) maintained in the filter (or in another location accessible to the filter) or within a predefined deviation therefrom (i.e., it is consistent with the historical pattern of accesses). If the address is within the lower and upper bounds of the addresses in the data structure or within a predefined deviation therefrom, the memory access is approved, and the data is loaded into the cache, STEP 658.

However, if the address is not within the lower and upper bounds of the addresses in the data structure or within the predefined deviation therefrom, then processing of the memory access is delayed, STEP 660. In one example, it is delayed until the access retires; i.e., if the memory access is part of speculative execution, it is delayed until speculation has ended. A determination is made as to whether the memory reference is valid, INQUIRY 662. For instance, with speculative execution, a determination is made as to whether the speculation was correct. If the memory reference is determined to be valid, then the access is approved, and the data is added to the cache and to the filter, STEP 664. Otherwise, the memory reference is discarded, STEP 666.

In one aspect, a filter is described that detects and prevents malicious events based on whether the events are consistent with a history of such events. In one particular example, the filter detects and prevents malicious accesses, such as malicious speculative accesses, based on whether the speculative accesses are within a range of addresses or a predefined deviation thereof.

For instance, in one embodiment, to detect and prevent malicious memory accesses, a dataset including a configurable number of last verified data load addresses is maintained. Verified indicates, e.g., that an instruction that initiated a load, when done speculatively, successfully retires. Load addresses are recorded in the dataset and have a predetermined lower bound and a predetermined upper bound. Based on receiving a new load instruction during speculative execution, a determination is made as to whether a load address of the new load instruction is within the predetermined lower bound and the predetermined upper bound or a predetermined tolerance outside the predetermined lower bound and the predetermined upper bound. Based on determining that the load address of the new load instruction is within the predetermined lower bound and the predetermined upper bound or a predetermined tolerance outside the predetermined lower bound and the predetermined upper bound, speculative execution is permitted. Further, based on determining that the load address of the new load instruction is not within the predetermined lower bound and the predetermined upper bound or a predetermined tolerance outside the predetermined lower bound and the predetermined upper bound, speculative execution is paused. Further, a determination is made as to whether an execution path of the new load instruction has been proven as valid using a predetermined set of conditions, and the load instruction is permitted to proceed, based on the execution path being proven valid.

Although particular examples and aspects have been described herein, many others are possible.

As an example, in a further aspect, if a program routinely accesses data in a stride-based pattern (as it would when accessing arrays), then any new access, even during speculation, is permissible if it is consistent with that history. For instance, the filter can look at past strides (also referred to as increment, pitch, or step size), and permit an access if it is consistent with known strides. Note that such strides normally do not contribute to the upper and lower bounds of the basic filter, as stride-based accesses would grow these bounds to such a degree that they would be ineffective. However, access stride history can be kept in, e.g., a separate table. The stride history mechanism, as part of the low-pass filter, helps to accurately assess an unexpected factor of new accesses. Accesses that are consistent with past strides are not unexpected. Accesses that are out-of-bounds are not consistent with known strides and are unexpected, and therefore, suspicious. They are to be filtered out of speculative execution. Other examples also exist.

In yet a further aspect, additional protection is afforded in case, for instance, the filter is exposed. This additional protection includes variability and risk assessment. Risk assessment has multiple dimensions including, for example, how important is the data to be protected; how much performance can be sacrificed to achieve an acceptable level of protection; what is an acceptable level of risk; and/or how likely is it that knowledge of the program layout is known, or will there be a force to sweep its memory?

In accordance with an aspect of the present invention, the filter can be adjusted, e.g., dynamically, at program load time, boot time, etc. Depending on the answers to the risk questions, the filter can be adjusted through, for instance, one or more controls, including, for instance, n and m, described above. Each control may be raised or lowered to adjust to the risks. If raised higher, more speculative loads are allowed, but at a higher risk of exploit. If lowered, greater protection is provided, with a cost of lower performance, as more speculative loads will be prevented (speculation will be paused) which may turn out to have been valid and could have been completed speculatively. An additional control includes, for instance, the degree of flexibility in calculating acceptable strides. Other examples are also possible.

In a further aspect, different programs or modules may need different levels of protection, and therefore, different filters for different program modules or subroutines are provided. For example, a program that does not need protection (or limited protection) against data leaks might be a weather forecasting model. Given that the weather forecast is guaranteed to be incorrect by some amount, and is to be released publicly, it may be selected to run that program with no filter. However, certain cryptographic programs might benefit from a maximum level of protection. Many examples of level of protection exist. Additionally, one program, such as an unprotected open-source browser, can use highly protected cryptographic subroutines. Further, multiple disjoint ranges of access history may be implemented. For example, one range is implemented for the stack, one for the data section, one for a table of contents or global offset table used in resolving addresses, etc. Alternatively, there could be separate ranges of offsets for any given index register. Many other examples exist.

In yet a further aspect, domain specific plug-ins are provided for the filter. Specific languages or applications may have different expected access patterns that could be plugged-in either through microcode updates or directly through a plug-in registration instruction (e.g., a privileged instruction). For instance, a business processing program may be associated with a filter that recognizes byte-oriented data record accesses, rather than array access strides. Other programs may benefit from a filter that recognizes larger chunks of data. In one aspect, a plug-in is dynamically and automatically selected based on the program to be executed or the current load.

As described above, in one or more aspects, one or more controls provide flexibility for the filter. For instance, n and m used in determining bounds may be adjusted (e.g., increased or decreased, as desired). As other examples, the controls include restrictions on strides, multiple disjoint filter ranges, and/or other controls. Further, in one or more aspects, the filter can be designed or tuned to be domain-specific—e.g., business vs. scientific. Additionally, in one or more aspects, the permitted entropy level could also be adjusted according to risk analysis—high-security applications (crypto) might need a very low entropy filter, but a weather model might not need any filter, etc. The controls to be used and/or how they are set can be configured and/or dynamically chosen based on, for instance, the machine, hypervisor boot, operating system boot, process load, and/or subroutine call—provided the ABI (application binary interface) has the right privilege (e.g., privileged instruction). Other examples are also possible.

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 7A-7B.

Referring to FIG. 7A, in one example, a determination is made as to whether a selected event of the computing environment is consistent with a historical pattern of selected events of the computing environment (700). Based on determining that the selected event is inconsistent with the historical pattern of selected events, processing associated with the selected event is delayed (702). Based on delaying processing associated with the selected event, a determination is made as to whether the selected event is valid (704). Based on determining that the selected event is valid, processing associated with the selected event is resumed (706).

By delaying processing associated with a selected event based on determining the selected event is inconsistent with a historical pattern of events, potential malicious events are prevented.

As an example, the selected event is a memory access and the historical pattern of selected events is a pattern of memory accesses. For instance, the selected event is a memory access requested by a program of the computing environment and the historical pattern of selected events includes memory accesses performed by another program of the computing environment (708). By delaying processing associated with a memory access based on determining that the memory access is inconsistent with a historical pattern of memory accesses, potential malicious memory accesses are prevented. This prevents unwanted leaks of information, as well.

In one example, the determining whether the selected event is consistent with the historical pattern includes determining whether the memory access is for an address within a range of addresses defined by the historical pattern of selected events or within a predefined deviation from the range of addresses defined by the historical pattern of selected events (710). The selected event is consistent with the historical pattern based on the address being within the range of addresses defined by the historical pattern of selected events or within the predefined deviation from the range of addresses defined by the historical pattern of selected events (712). This provides an efficient mechanism for determining whether a selected event is consistent with the historical pattern, and for, at least, delaying events which may be undesirable.

In another example, the determining whether the event is consistent with the historical pattern includes determining whether the selected event is consistent with a history of strides (714).

Further, with reference to FIG. 7B, in one embodiment, a data structure that includes information relating to the historical pattern of selected events is maintained (716). For example, the historical pattern of selected events includes memory accesses and the data structure includes addresses accessed by the memory accesses (718). The data structure includes, for instance, a configurable number of last verified data load addresses (720). A data load address is verified, for instance, based on an instruction initiating a load speculatively successfully retiring (722). In one example, the last verified data load addresses include a lower bound address and an upper bound address (724).

As one particular example, the selected event includes a memory access specified by a load instruction issued during speculative execution (726). The determining whether the selected event is consistent with the historical pattern of selected events includes determining, based on obtaining the load instruction during speculative execution, whether a load address of the load instruction is within the lower bound address and the upper bound address or within a predefined deviation from a range of addresses defined by the lower bound address and the upper bound address (728). The selected event is consistent with the historical pattern of selected events, based on the load address being within the lower bound address and the upper bound address or within the predefined deviation from the range of addresses (730). The delaying processing includes, for example, delaying execution of the load instruction in speculative execution (732), and the resuming processing includes, for instance, executing the load instruction based on determining that the selected event is valid (e.g., speculation was correct) (734).

As described herein, a capability is provided that prevents data leakage during, for instance, speculative execution including, for example, cache prefetches that occur during speculative execution. Controls are provided to determine whether potential accesses are consistent with past accesses, and if not, the potential accesses are at least delayed until determined whether they are valid. If valid, they continue; if not, they are discarded.

Other variations and embodiments are possible. For instance, different types of memory accesses (e.g., speculative, non-speculative, cache, other levels of memory, etc.) and/or other types of events may be detected and/or prevented. Further, the table of accesses may include accesses different from and/or in addition to retired accesses. Other variations are possible.

Figure 8A:
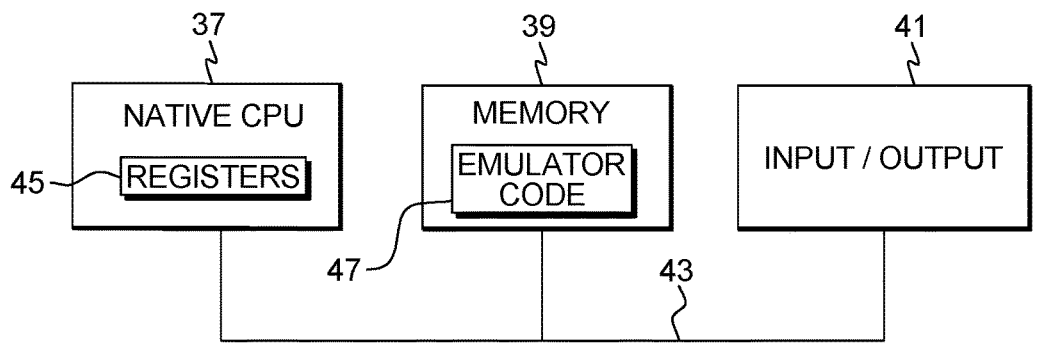
FIG. 8A depicts another example of a computing environment to incorporate and use one or more aspects of the present invention.

Other types of computing environments may also incorporate and use one or more aspects of the present invention, including, but not limited to, emulation environments, an example of which is described with reference to FIG. 8A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC® processor offered by International Business Machines Corporation, Armonk, N.Y.; and/or other machines based on architectures offered by International Business Machines Corporation, Intel Corporation, or other companies. PowerPC is a trademark or registered trademark of International Business Machines Corporation in at least one jurisdiction. Intel is a trademark or registered trademark of Intel Corporation or its subsidiaries in the United States and other countries.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 8B:
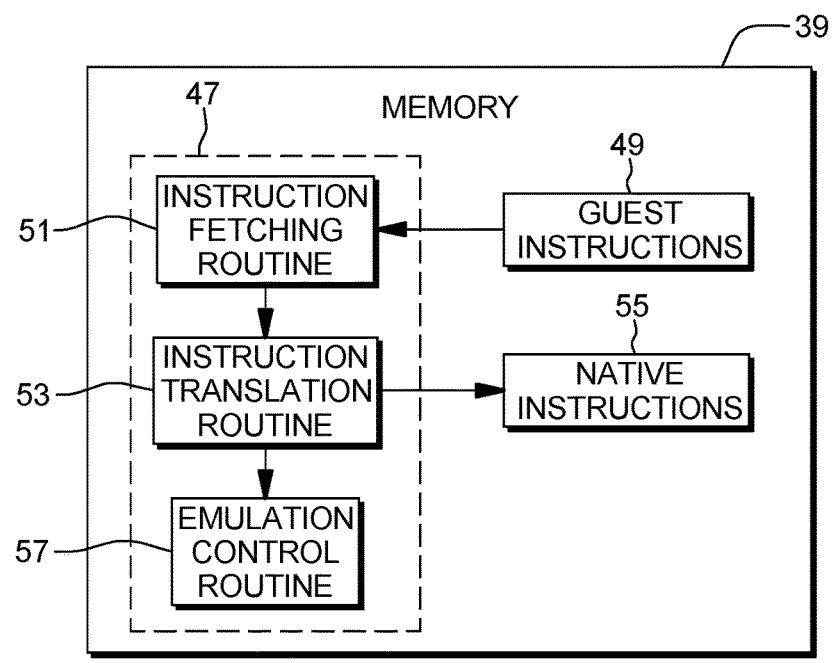
FIG. 8B depicts further details of the memory of FIG. 8A.

Further details relating to emulator code 47 are described with reference to FIG. 8B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, a PowerPC or other processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

A guest instruction 49 that is obtained, translated and executed may be, for instance, one of the instructions described herein. The instruction, which is of one architecture (e.g., the z/Architecture hardware architecture), is fetched from memory, translated and represented as a sequence of native instructions 55 of another architecture (e.g., PowerPC, Intel, etc.). These native instructions are then executed.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
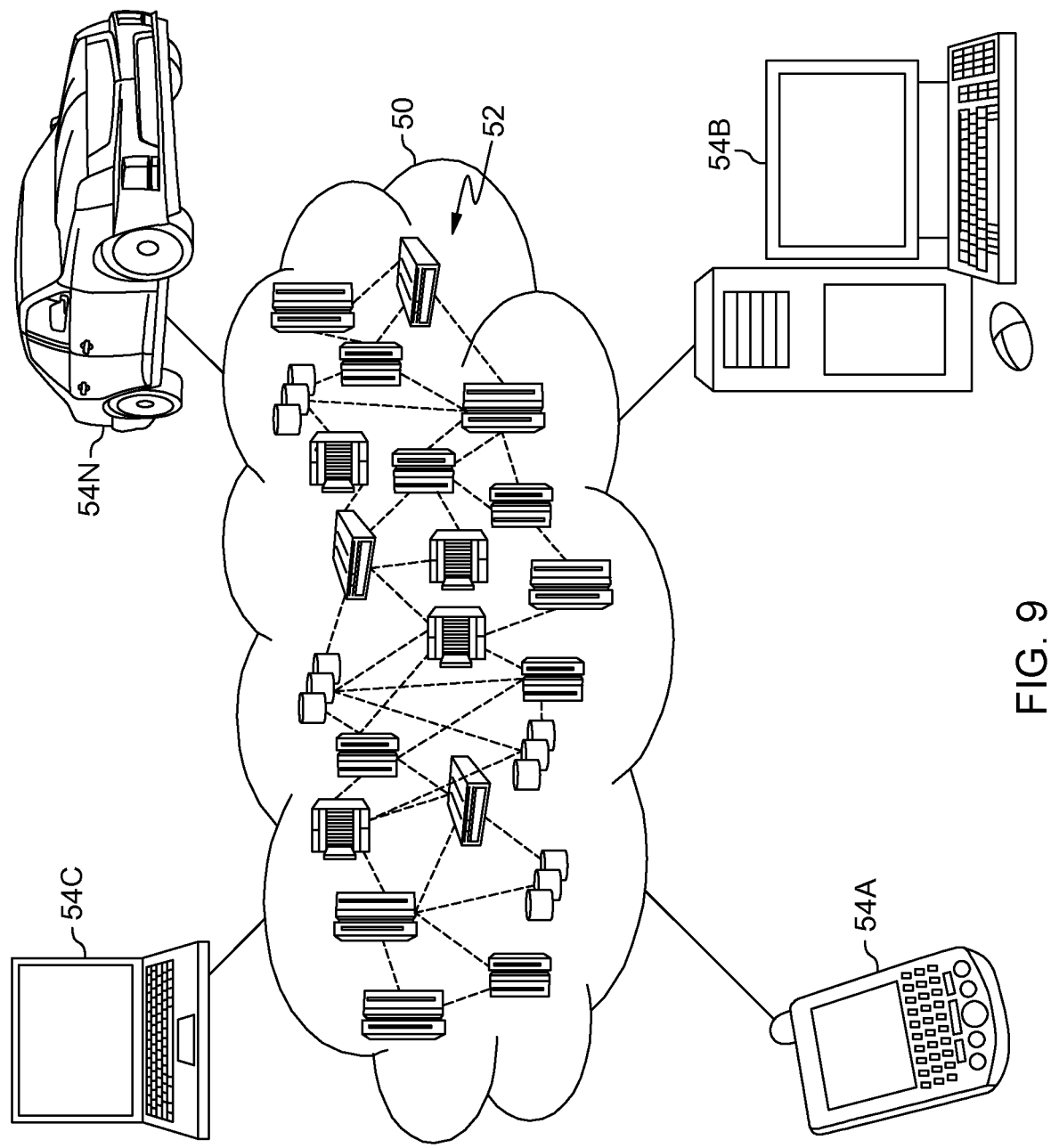
FIG. 9 depicts one embodiment of a cloud computing environment.

Referring now to FIG. 9, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 52 and cloud computing environment 50 can communicate with any type of computerized device over any type of network and/or network addressable connection (e.g., using a web browser).

Figure 10:
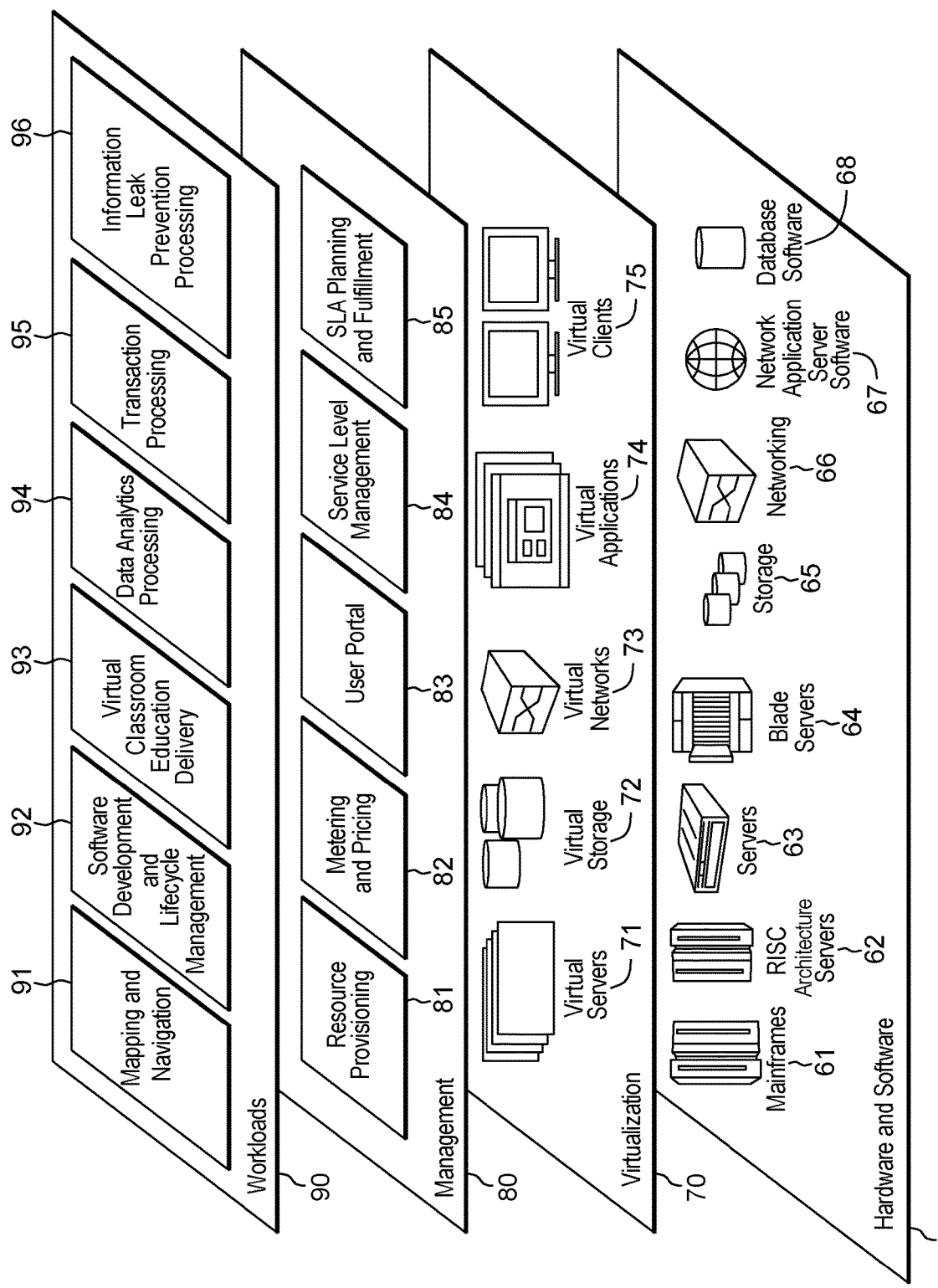
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective event prevention processing to, e.g., prevent information leaks 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, other types of events may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   a non-transitory computer readable storage medium readable by a processing circuit and storing instructions for performing a method comprising:
       determining that a selected event of the computing environment is inconsistent with a historical pattern of selected events of the computing environment, the historical pattern of selected events having been obtained from normal execution flows of the selected event, and being a filter based on if previous selected events;
       wherein the historical pattern of selected events comprises memory accesses, wherein the filter comprises a configurable number of previous verified data load addresses accessed by the memory accesses, wherein a data load address is verified based on an instruction initiating a load speculatively successfully retiring, and wherein the previous verified data load addresses comprise a lower bound address and an upper bound address;
       wherein the determining comprises determining that the selected event is outside the lower and upper bound of the filter and represents a suspicious deviation from the historical pattern of selected events;
       delaying processing associated with the selected event, based on determining that the selected event is inconsistent with the historical pattern of selected events;
       determining, based on delaying processing associated with the selected event, whether the selected event is valid; and
       resuming processing associated with the selected event, based on determining that the selected event is valid.

2. The computer program product of claim 1, wherein the selected event is a memory access requested by a program of the computing environment and the historical pattern of selected events includes memory accesses performed by another program of the computing environment.

3. The computer program product of claim 2, wherein the determining that the selected event is inconsistent with the historical pattern comprises determining whether the memory access is for an address within a range of addresses defined by the historical pattern of selected events or within a predefined deviation from the range of addresses defined by the historical pattern of selected events, wherein the selected event is consistent with the historical pattern based on the address being within the range of addresses defined by the historical pattern of selected events or within the predefined deviation from the range of addresses defined by the historical pattern of selected events.

4. The computer program product of claim 1, wherein the determining that the event is inconsistent with the historical pattern comprises determining whether the selected event is consistent with a history of strides.

5. The computer program product of claim 1, wherein the method further comprises maintaining a data structure that includes information relating to the historical pattern of selected events.

6. The computer program product of claim 5, wherein the data structure includes addresses accessed by the memory accesses.

7. The computer program product of claim 5, wherein the selected event comprises a memory access specified by a load instruction issued during speculative execution, and wherein the determining that the selected event is inconsistent with the historical pattern of selected events comprises determining, based on obtaining the load instruction during speculative execution, whether a load address of the load instruction is within the lower bound address and the upper bound address or within a predefined deviation from a range of addresses defined by the lower bound address and the upper bound address, wherein the selected event is consistent with the historical pattern of selected events, based on the load address being within the lower bound address and the upper bound address or within the predefined deviation from the range of addresses.

8. The computer program product of claim 7, wherein the delaying processing comprises delaying execution of the load instruction in speculative execution.

9. The computer program product of claim 8, wherein the resuming processing comprises executing the load instruction based on determining that the selected event is valid.

10. A computer system for facilitating processing within a computing environment, the computer system comprising:
    a memory; and
    a processing circuit in communication with the memory, wherein the computer system is configured to perform a method, said method comprising:
        determining that a selected event of the computing environment is inconsistent with a historical pattern of selected events of the computing environment, the historical pattern of selected events having been obtained from normal execution flows of the selected event, and being a filter based on if previous selected events;
        wherein the historical pattern of selected events comprises memory accesses, wherein the filter comprises a configurable number of previous verified data load addresses accessed by the memory accesses, wherein a data load address is verified based on an instruction initiating a load speculatively successfully retiring, and wherein the previous verified data load addresses comprise a lower bound address and an upper bound address;
        wherein the determining comprises determining that the selected event is outside the lower and upper bound of the filter and represents a suspicious deviation from the historical pattern of selected events;
        delaying processing associated with the selected event, based on determining that the selected event is inconsistent with the historical pattern of selected events;
        determining, based on delaying processing associated with the selected event, whether the selected event is valid; and
        resuming processing associated with the selected event, based on determining that the selected event is valid.

11. The computer system of claim 10, wherein the selected event is a memory access requested by a program of the computing environment and the historical pattern of selected events includes memory accesses performed by another program of the computing environment.

12. The computer system of claim 11, wherein the determining that the selected event is inconsistent with the historical pattern comprises determining whether the memory access is for an address within a range of addresses defined by the historical pattern of selected events or within a predefined deviation from the range of addresses defined by the historical pattern of selected events, wherein the selected event is consistent with the historical pattern based on the address being within the range of addresses defined by the historical pattern of selected events or within the predefined deviation from the range of addresses defined by the historical pattern of selected events.

13. The computer system of claim 10, further comprising a data structure that includes information relating to the historical pattern of selected events, the data structure including addresses accessed by the memory accesses.

14. The computer system of claim 13, wherein the selected event comprises a memory access specified by a load instruction issued during speculative execution, and wherein the determining that the selected event is inconsistent with the historical pattern of selected events comprises determining, based on obtaining the load instruction during speculative execution, whether a load address of the load instruction is within the lower bound address and the upper bound address or within a predefined deviation from a range of addresses defined by the lower bound address and the upper bound address, wherein the selected event is consistent with the historical pattern of selected events, based on the load address being within the lower bound address and the upper bound address or within the predefined deviation from the range of addresses.

15. A computer-implemented method of facilitating processing within a computing environment, the computer-implemented method comprising:
    determining that a selected event of the computing environment is inconsistent with a historical pattern of selected events of the computing environment, the historical pattern of selected events having been obtained from normal execution flows of the selected event, and being a filter based on if previous selected events;
    wherein the historical pattern of selected events comprises memory accesses, wherein the filter comprises a configurable number of previous verified data load addresses accessed by the memory accesses, wherein a data load address is verified based on an instruction initiating a load speculatively successfully retiring, and wherein the previous verified data load addresses comprise a lower bound address and an upper bound address;
    wherein the determining comprises determining that the selected event is outside the lower and upper bound of the filter and represents a suspicious deviation from the historical pattern of selected events;
    delaying processing associated with the selected event, based on determining that the selected event is inconsistent with the historical pattern of selected events;
    determining, based on delaying processing associated with the selected event, whether the selected event is valid; and
    resuming processing associated with the selected event, based on determining that the selected event is valid.

16. The computer-implemented method of claim 15, wherein the selected event is a memory access requested by a program of the computing environment and the historical pattern of selected events includes memory accesses performed by another program of the computing environment.

17. The computer-implemented method of claim 16, wherein the determining that the selected event is inconsistent with the historical pattern comprises determining whether the memory access is for an address within a range of addresses defined by the historical pattern of selected events or within a predefined deviation from the range of addresses defined by the historical pattern of selected events, wherein the selected event is consistent with the historical pattern based on the address being within the range of addresses defined by the historical pattern of selected events or within the predefined deviation from the range of addresses defined by the historical pattern of selected events.

18. The computer-implemented method of claim 15, further comprising maintaining a data structure that includes information relating to the historical pattern of selected events, wherein the data structure includes addresses accessed by the memory accesses.

19. The computer-implemented method of claim 18, wherein the selected event comprises a memory access specified by a load instruction issued during speculative execution, and wherein the determining that the selected event is inconsistent with the historical pattern of selected events comprises determining, based on obtaining the load instruction during speculative execution, whether a load address of the load instruction is within the lower bound address and the upper bound address or within a predefined deviation from a range of addresses defined by the lower bound address and the upper bound address, wherein the selected event is consistent with the historical pattern of selected events, based on the load address being within the lower bound address and the upper bound address or within the predefined deviation from the range of addresses.

\* \* \* \* \*